J. MILLAR.
BELT FASTENING DEVICE.
APPLICATION FILED MAY 14, 1919.
1,361,083.
Patented Dec. 7, 1920.
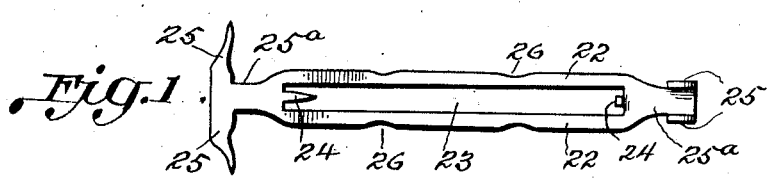
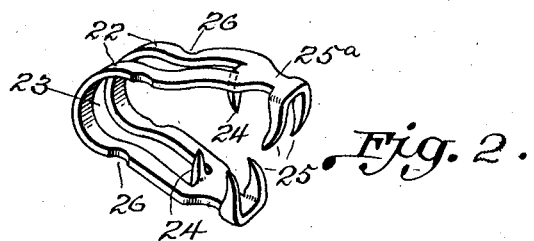
Inventor;
John Millar
by C. F. Been
Atty.

UNITED STATES PATENT OFFICE.

JOHN MILLAR, OF CINCINNATI, OHIO.

BELT-FASTENING DEVICE.

1,361,083.

Specification of Letters Patent.　Patented Dec. 7, 1920.

Application filed May 14, 1919. Serial No. 297,090.

*To all whom it may concern:*

Be it known that I, JOHN MILLAR, a citizen of the United States, residing at Cincinnati, in the county of Hamilton and State of Ohio, have invented certain new and useful Improvements in Belt-Fastening Devices, of which the following is a specification.

This invention relates to belt fastenings and pertains especially to metallic fastening devices for the meeting ends of pulley belts, and constitutes various improvements in my Patents No. 817501, No. 125611, No. 1283442, and No. 1,300,637.

The object of this invention is to provide belt fasteners having peculiar shapes, and peculiarly shaped clenching prongs or claws specially arranged relative to each other and bendable in different and various directions in a belt clenching operation.

In the accompanying drawings forming part of this application:—

Figure 1 is a plan view of a fastener as stamped out of a sheet of metal and showing certain of the prongs bent into position.

Fig. 2 is a perspective view of this fastener bent into hinged position preparatory to applying to a belt.

The same reference characters denote the same parts throughout the several views of the drawings.

I have devised certain flexible or pliable prongs having certain location with respect to each other and with respect to the length and breadth of the fasteners and the fastening members, whereby all of such prongs are bendable into clenching position, and certain of said prongs are bendable in opposite directions, or in directions at an angle to each other in the same fastening.

In carrying out my invention I employ such metal as may be cut and bent into desired forms or shapes, preferably sheet or plate metal from which may be stamped or cut a plurality of fastenings or fastening members with as little waste of material as possible.

This fastener has a widened portion or body comprising parallel ribs 22 divided by a longitudinal slot 23, in the ends of which is formed a prong or spur 24 bendable from the slot into clenching position at right angles to said ribs and bendable toward the ends of said ribs in a clenching operation. The ends of said members are provided with clenching prongs 25 bendable inwardly or toward the spurs 24 and lengthwise the ribs 22 in a clenching operation. A neck 25$^a$ is formed between the spurs 24 and the prongs 25, so as to permit the prongs 25 to be placed in longitudinal line with the ribs 22. The outer edge of the ribs 22 is notched or grooved as at 26 so as to facilitate proper bending of the ribs 22 into hinge form preparatory to applying this fastener to a belt. It will be observed that this form of fastener affords lightness and stability in the rib members, and a double alternate clenching at both ends by reason of the central or slot spurs being located between the prongs 25, and at such distance apart as to permit said prongs and spurs to bend in opposite directions over the plate necks.

It will be understood that any number of fastening members may be cut or stamped out at the same time from the same piece or sheet of metal, and that any number of such members may constitute a fastener according to the width or size of a belt.

Obviously a plurality of these fasteners are clenched to the meeting ends of a belt with the hinge portions of the fasteners meshing so as to permit insertion of a suitable pin.

Having thus described my invention what I claim as new and desire to secure by Letters Patent is:—

In a belt fastening device, a flexible body member having a widened portion adapted to be bent into a hinge loop, arms projecting from said portion, flexible clenching prongs on the side edges of the arms and arranged in pairs adjacent to the end of the arms and bendable inwardly lengthwise the arms, and a flexible clenching prong on said arms adjacent to the said pairs of prongs and bendable toward said pairs of prongs in a belt clenching operation.

In witness whereof I hereunto set my hand in the presence of two witnesses.

JOHN MILLAR.

Witnesses:
WM. OTTAWAY,
ROY E. LEONARD.